Patented Apr. 13, 1937

2,077,094

UNITED STATES PATENT OFFICE 2,077,094

BUILDING MATERIAL AND METHOD OF MAKING THE SAME

William Byers, Kansas City, Mo.

No Drawing. Application December 26, 1931, Serial No. 583,407

10 Claims. (Cl. 106—18)

This invention relates to light weight, non-conducting moulded building material.

The principal object of the present invention is the provision of a light weight building material of low heat and sound conductivity and of a permanent rigidity and form suitable for use under varying conditions.

A further object of the instant invention is the method of producing a building material which consists in heating a mixture of expanded vermiculite and resinous emulsion to eliminate a larger portion of the volatile material and to produce a relatively thin resilient binder for the particles of expanded vermiculite.

Another object of this invention is the method of producing a building material which consists in baking a mixture of expanded micaceous material and a resinous emulsion to a temperature below the coking temperature of said materials.

A still further object of the invention is the method of producing a building material by heating a mixture of micaceous material and a resinous emulsion.

Other objects will be set forth in the following specification.

The resinous emulsion as used in this invention consists of a mucilaginous liquid in combination with a resinous material which when mixed with the vermiculite will bind the mass in a predetermined form during the molding and baking process and will produce a permanent binder.

By the terms "expanded micaceous material" and "expanded vermiculite" as used in the specification and some of the appended claims, is meant the product produced when vermiculite, in its natural state is subjected to a treatment whereby the crystalized forms or leaves thereof are partially separated to a certain extent, thus increasing the volume of said vermiculite or micaceous material.

It is well known that expanded vermiculite and other similar materials can be cemented together by asphalt, rosin, resins, etc., to produce a building material, however, when so bound together by the present known method the resulting product has many defects, such as excessive weight, high cost, inflammability, lowered insulating efficiency, etc. When a sufficient amount of the binding material is used with the expanded material to properly hold it together for molding, the resultant product has a quantity of the binding material in excess of the amount actually necessary to cement the pieces together. It is the principal object of this invention to overcome the above defects by mixing the expanded vermiculite with materials, which when mixed will produce a mass that when molded will retain its shape under ordinary handling and when heated, will lose a large percent of its weight, and at the same time leave a resilient residue sufficient to produce a practical binder to hold the pieces of expanded vermiculite in fixed relation.

In carrying out this invention expanded vermiculite of any desired size or condition is mixed with a resinous emulsion and then subjected to a sufficient heat to drive off most of the volatile ingredients, without coking the resinous residue, which forms a very thin coating over the pieces of vermiculite to bind them together. When using asphalt, tar, pitch, or any of the hydrocarbons in solution in an emulsion, it is apparent that much less of the asphalt or other hydrocarbons may be used since the volume of the solution is sufficient to properly cover the surface of vermiculite while the mucilaginous substance of the emulsion will function to hold the vermiculite in molded form until such time as an adhesive resinous residue is produced, by the elimination of most of the volatile ingredients, to permanently bind the vermiculite together. The liquid with which the vermiculite is mixed may be such that as much as 85% or more of its weight may be eliminated from the molded mass without coking the residue or destroying its efficiency as a binder, thereby producing a building material of low specific gravity.

The mucilaginous, viscid, or sticky substance contained in the emulsion should be of such a nature as to hold the particles of vermiculite together both in the wet and dry state, since the resinous binder in diluted form will probably not hold sufficiently until after it has been dried out to produce a residue of proper consistency. When the building material is produced as described above, it is apparent that each particle of the vermiculite will be coated with a very thin layer of the resinous material, thereby producing a substantially water-proof covering for the vermiculite which preserves its form and insulating qualities to a large degree. After the material is produced the outer surface may be sanded to expose the vermiculite formation if desired. The building material might also be faced with a coating of sheet material, paint, etc. to obtain different effects and qualities.

The sticky substance in the emulsion may be wheat flour dextrin, sodium silicate, tapioca flour, glucose, molasses, gum arabic, casein, animal glues, and many other similar substances having a mucilaginous quality. During the baking process this sticky material which is emulsified and mixed with the resinous binder may lose its adhesiveness, but not until the resinous binder is properly formed to retain the molded vermiculite in the desired shape. Bentonite, very plastic clays, paper pulp, powdered asbestos fiber, also may be used to facilitate the binding power of the emulsion, provided that the resultant emulsion of resinous material, fiber, water and oil is sticky enough to form a temporary binder for the vermiculite mass when molded.

To produce the desired building material a quantity of expanded vermiculite of any suitable size is thoroughly mixed with an emulsion containing a resinous or resinifying material such as asphalt, tars, pitches, rosin, paint varnish resins, synthetic resins, drying oils such as linseed, tung oil, japans, etc., placed in molds and pressed together with pressure of about three pounds per square inch or more if a denser block is required.

The block is removed from the mold and gradually dried until most of the water is driven therefrom, when it may be heated more rapidly up to 500 to 800 degrees Fahrenheit, dependent upon the composition. The maximum temperature used in drying or baking should not be sufficient to coke the resinous residue, but only sufficient to produce a resilient adhesive mass. Since the composition of the emulsion may vary materially, it is not practical to limit the baking heat to any definite degree. The drying of the mixture may be accomplished in any of the usual ways, but in order to produce large quantities of the building material rapidly, it is deemed advisable to apply properly controlled heat to hasten the process. Air drying would accomplish the same results but the time required in most instances would be too long to make this method practical.

Some oils, resins, and asphalts may be emulsified by water alone or by water and acid. These emulsions may be used in this invention providing the sticky substance formed will hold the molded article in form during molding and baking and the resultant residue is strong enough for practical use. By adding to the emulsion a quantity of asbestos fiber it has been found that a product is produced that has greater strength and rigidity.

An emulsion of sodium silicate (water glass) and asphalt produces an emulsion which permits of the spreading of a very thin layer of the solution over the vermiculite and at the same time produces a very effective binder when properly dried out by heating and baking. While this emulsion may not produce the extremely light weight building material, yet it will produce a very practical, cheap and strong product that has most of the desirable qualities of a light weight, non-conductive and durable building material.

It will be understood that other emulsions and resinous or binding materials than those above set forth may be used to produce this building material. Furthermore, the method of driving the volatile materials from the mass may be greatly varied, dependent upon conditions and the product to be formed. Therefore, I do not wish to limit myself to the specific method set forth for the making of this novel product, but desire to be limited only by the scope of the appended claims.

What I claim as new and desire to cover by Letters Patent is:

1. A building material comprising expanded vermiculite having baked therewith an emulsified resinous binding material.

2. A building material comprising a molded, expanded vermiculite body bound together by means of a baked resinous emulsified binding material.

3. A building material comprising a baked mixture of expanded vermiculite, emulsified resinous binding material and asbestos fiber.

4. A building material comprising a baked mixture of expanded vermiculite and emulsified resinous binder having a specific gravity below .35.

5. A molded building material of light weight produced by heating a mixture of expanded vermiculite, a mucilaginous substance and an emulsified resinous liquid.

6. A building material produced by baking a mixture of expanded vermiculite, mucilaginous substance and emulsified resinous material at a temperature below the coking temperature of said resinous material.

7. A building material produced by expanding particles of vermiculite, mixing said expanded vermiculite with an emulsion containing a resinous material, then subjecting the mixture to a heat below the coking temperature of said resinous material, whereby the mass is made rigid.

8. The process of producing a building material which consists in molding, then baking a mixture of expanded vermiculite and a bituminous emulsion.

9. The process of producing a building material which consists in baking a mixture of expanded vermiculite and a resinous emulsion.

10. The process of producing a building material which consists of drying a mixture of expanded vermiculite, an asphalt dispersed with bentonite and water, and sufficient bentonite in excess of the amount required to disperse the asphalt to hold the vermiculite together while the volatile ingredients are being expelled.

WILLIAM BYERS.